US011965358B2

(12) United States Patent
Van der Wal et al.

(10) Patent No.: US 11,965,358 B2
(45) Date of Patent: Apr. 23, 2024

(54) STRIKE LINKAGE AND IN-WALL RECEIVER

(71) Applicant: DEN Smart Home, Enschede (NL)

(72) Inventors: Marijn Van der Wal, Enschede (NL); Robert Wouter Maria Boensma, Delden (NL); Daraius K Hathiram, Austin, TX (US); Avi Rosenthal, Ashburn, VA (US); Elsabe Margaretha Hendrina Dragt-de Jong, Bathmen (NL); Arjan Aalvink, Vriezenveen (NL); David M. Kaplan, Seattle, WA (US); Lewis Brown, Oakland, CA (US)

(73) Assignee: Ankerslot Group B.V., Enschede (NL)

( * ) Notice: Subject to any disclaimer, the term of this patent is extended or adjusted under 35 U.S.C. 154(b) by 5 days.

(21) Appl. No.: 17/567,713

(22) Filed: Jan. 3, 2022

(65) Prior Publication Data

US 2023/0228123 A1 Jul. 20, 2023

(51) Int. Cl.
*E05B 47/00* (2006.01)

(52) U.S. Cl.
CPC ...... *E05B 47/0012* (2013.01); *E05B 47/0046* (2013.01); *E05B 2047/0016* (2013.01);
(Continued)

(58) Field of Classification Search
CPC ............. E05B 47/0046; E05B 47/0047; E05B 2047/0015; E05B 2047/0016;
(Continued)

(56) References Cited

U.S. PATENT DOCUMENTS 3,640,560 A * 2/1972 Zawadzki ........... E05B 47/0047 292/201
4,471,983 A * 9/1984 Bischoff ............. E05B 47/0047 292/341.16

(Continued)

FOREIGN PATENT DOCUMENTS

CN 116378510 A 7/2023
DE 102005028957 12/2006

(Continued)

OTHER PUBLICATIONS

Computer Generated Translation for DE 202015105732 U1, Generated on Aug. 8, 2023, https://worldwide.espacenet.com/ (Year: 2023).*

(Continued)

*Primary Examiner* — Alyson M Merlino
(74) *Attorney, Agent, or Firm* — Schwegman Lundberg & Woessner, P.A.

(57) ABSTRACT

A wirelessly-controlled jamb-mounted access control system can include an in-jamb housing, a lock body at least partially inside the housing and rotatable about a first axis between locked and unlocked positions. The first axis can extend parallel to the jamb, and the lock body can include inner and outer sidewalls that define a latch cavity configured to receive a latch tongue of a door. The wirelessly-controlled jamb-mounted access control system can further include an actuator configured to control release of the lock body from the locked position in response to a control signal.

10 Claims, 8 Drawing Sheets

(52) U.S. Cl.
CPC ................. *E05B 2047/0017* (2013.01); *E05B 2047/0024* (2013.01); *E05B 2047/0094* (2013.01)

(58) Field of Classification Search
CPC ..... E05B 2047/0017; E05B 2047/0024; E05B 2047/0036
See application file for complete search history.

(56) References Cited

U.S. PATENT DOCUMENTS

| | | | | |
|---|---|---|---|---|
| 4,648,253 | A | 3/1987 | Imhoff | |
| 4,756,566 | A * | 7/1988 | Logas | E05B 47/0047 292/341.16 |
| 5,988,711 | A * | 11/1999 | Toma | E05B 47/0047 292/201 |
| 6,966,585 | B2 * | 11/2005 | Egi | E05B 47/0047 292/201 |
| 6,967,562 | B2 | 11/2005 | Menard et al. | |
| 8,643,468 | B1 | 2/2014 | Peabody et al. | |
| 10,214,947 | B2 | 2/2019 | Marsh | |
| 2006/0175841 | A1 * | 8/2006 | Toma | E05B 47/0047 340/686.1 |
| 2008/0136200 | A1 * | 6/2008 | Wittke | E05B 47/0047 292/341.16 |
| 2014/0247113 | A1 | 9/2014 | Paquin | |
| 2015/0167351 | A1 * | 6/2015 | Singh | E05B 47/0047 292/341.15 |
| 2015/0308167 | A1 * | 10/2015 | Chang | E05B 47/0046 292/214 |
| 2018/0051478 | A1 * | 2/2018 | Tagtow | E05B 47/0012 |
| 2019/0277061 | A1 | 9/2019 | Lee et al. | |
| 2019/0376317 | A1 | 12/2019 | Hsu | |
| 2020/0370337 | A1 * | 11/2020 | Singh | E05B 47/0047 |
| 2022/0364388 | A1 * | 11/2022 | Guy | E05B 47/0047 |

FOREIGN PATENT DOCUMENTS

| | | | | |
|---|---|---|---|---|
| DE | 102009035737 | | 2/2011 | |
| DE | 202015105732 | U1 * | 1/2016 | E05B 47/0047 |
| DE | 212018000364 | | 8/2020 | |
| EP | 1788169 | | 5/2007 | |
| FR | 3043118 | | 5/2017 | |
| FR | 3043118 | | 7/2019 | |
| GB | 2134959 | | 8/1984 | |
| WO | 9011422 | | 10/1990 | |
| WO | 9626340 | | 8/1996 | |
| WO | 2018112537 | | 6/2018 | |

OTHER PUBLICATIONS

"European Application Serial No. 23150034.9, Extended European Search Report dated May 4, 2023", 8 pgs.
"European Application Serial No. 23150034.9, Response filed Jul. 25, 2023 to Extended European Search Report dated May 4, 2023", 25 pgs.

* cited by examiner

STRIKE LINKAGE AND IN-WALL RECEIVER

FIELD OF THE INVENTION

The present subject matter relates generally to door lock or door access systems, and more particularly, to electronic door lock or door access systems.

BACKGROUND

Conventional mechanical door lock systems often include a latch tongue connected to a swinging door. The latch tongue can extend outwardly from the door and engage a strike plate to maintain the door in a closed position. The strike plate can be mounted to an opposing jamb of a door frame to limit movement of the door relative to the door frame. To open the door, a user can manipulate a handle of the system to cause the latch tongue to translate toward the door, disengage from the strike plate, and thereby allow movement of the door relative to the door frame. If the door is locked, a user may first insert and rotate a key in a lock mounted to the door, such as to enable, or directly cause, the latch tongue to translate toward the door and disengage the strike plate. However, such systems require the user to physically maintain and use the key to lock or unlock the door.

An electronic door lock system can help eliminate the need for a physical key to lock or unlock the door, such as by including an electrically translatable latch tongue and a controller in communication with a door module that is coupled to the door and integrated with the lock. To gain access, a user can, for example, manually enter a code into a keypad of the door module, scan an electronic access card via the door module, or otherwise engage with the door module to cause the controller to check the user's input against a list of recognized security keys or codes. In response, the controller can generate a signal configured to enable, or directly cause, electrically-powered translation of the latch tongue system away from the strike plate. In some examples, the controller of such systems can be in wireless communication with an external device, such as to allow a user to input a code from a remote location to unlock or lock the door.

BRIEF DESCRIPTION OF THE DRAWINGS

In the drawings, which are not necessarily drawn to scale, like numerals may describe similar components in different views.

DETAILED DESCRIPTION

Figure 1B:
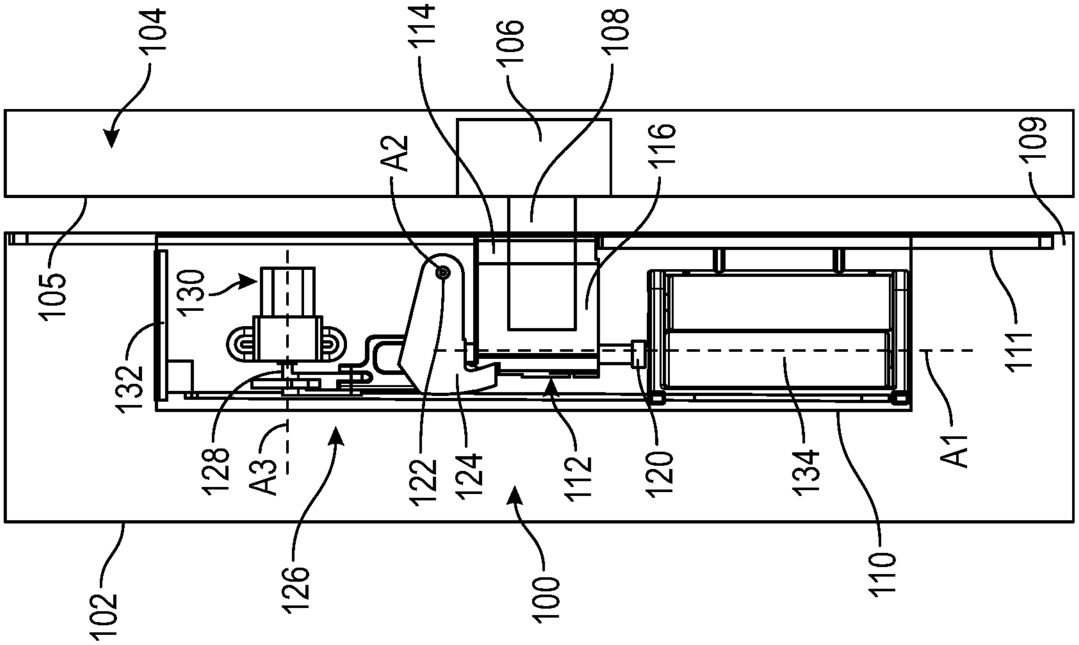
FIG. 1B illustrates a side view of a portion of the first access control system of FIG. 1A.

The following description and the drawings sufficiently illustrate specific examples to enable those skilled in the art to practice them. Other examples may incorporate structural, process, or other changes without departing from the scope of the present subject matter.

The present inventors have recognized, among other things, that a problem to be solved includes providing an electronic and remotely-actuatable access control or door lock system. The present inventors have recognized that some electronic lock systems are less functional, less reliable, more costly, and/or are less aesthetically pleasing than conventional mechanical lock systems. Some solutions can include systems that obstruct access to a door-mounted lock, such as by blocking or eliminating a keyhole located on at least one side of the door. Some systems require or use various separate components, such as controllers, power sources, motors or actuators, linkages, and various electrical connections that can be difficult or complicated to install. For example, an installer may need to drill one or more guide bores into the door or the door frame to receive signal and power wires or other electrical components. Further, such wires or other components must be routed to the door, and can be susceptible to premature failure due to extended exposure to the elements, or damage incurred during installation or normal use. The inventors have further recognized that the problem can include lock systems that are physically large in size and may include various external components, such as keypads or card readers, or internal components housed within the lock system, such as electric motors or actuators.

The present inventors have recognized that a solution to these problems and others can include or use an electronic, jamb-mounted access control system. The jamb-mounted system can help streamline installation, and can help maintain outward aesthetic appearances of the door and jamb area substantially unchanged. Furthermore, the solution can include providing the function and reliability of a conventional mechanical door lock system while concurrently providing the benefits associated with electronic door lock systems. In an example, the electronic jamb-mounted access control system can be entirely or partially contained within a single housing that is configured to be received by, or installed in, the jamb of a door frame, such as in place of a conventional door strike plate. This jamb-mounted configuration can allow a user to lock or unlock a door, for example, without requiring actuation of the latch tongue that is coupled to a swinging door. As such, the electronic jamb-mounted access control system can be compatible with, and may not significantly affect the installation, appearance, or reliability of, any conventional mechanical lock system that may be additionally installed or used.

In an example, the electronic jamb-mounted access control system can include or use a wirelessly-enabled controller configured to enable or prevent movement of a swinging door by way of a movable lock body interfacing with the latch tongue of the door. For example, in response to a wirelessly-communicated control signal, the controller can be configured to control rotation of the lock body to thereby retain or release the latch tongue. In an example, the wirelessly-communicated control signal can be from a user's mobile phone, home automation gateway, or other local or remote signal source.

Figure 1A:
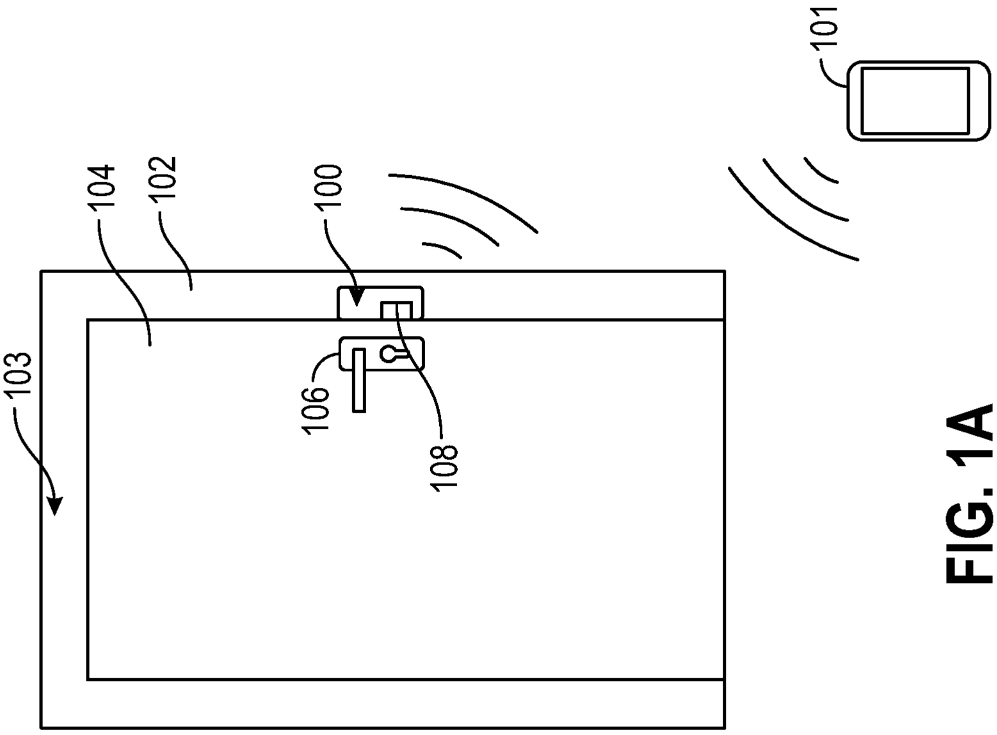
FIG. 1A illustrates an example of a first access control system in wireless communication with an external device.

FIG. 1A illustrates an example of a first access control system 100 in wireless communication with an external device 101. FIG. 1B illustrates aside view of the jamb-mounted access control system of FIG. 1A receiving a latch tongue 108 of a door 104. FIG. 1B illustrates a first axis A1, a second axis A2, and a third axis A3.

The first access control system 100 can be installed or received within, or otherwise provided at least partially inside of, a jamb 102 of a door frame 103 (FIG. 1A). The door 104 can be a swinging door that is pivotably connected to the door frame 103 using hinges, and the door 104 can include an outer surface 105. The outer surface 105 can be a surface of the door 104 facing, opposing, or otherwise most proximal to, the first access control system 100 and the jamb 102.

The door 104 can optionally include a lock system 106. The lock system 106 can be any kind of door-mounted, latch or bolt-controlling mechanism. In an example, a portion of the lock system 106 can be fixedly coupled to, and extend transversely through, a portion of the door 104. In some examples, the lock system 106 can include the latch tongue 108. The latch tongue 108 can be, for example, a day latch or primary latch of the lock system 106, such as operably connected to a handle or doorknob of the lock system 106, or a night latch or secondary latch of the lock system 106, such as operably connected to a deadbolt or night lock of the lock system 106.

The latch tongue 108 can generally extend outwardly beyond the outer surface 105 of the door 104 toward the first access control system 100, such that the latch tongue 108 can engage a portion of the first access control system 100, for example when the door 104 is in a closed position as shown in FIGS. 1A-1B.

In an example, the first access control system 100 can include one or more of a housing 110, a first panel 111, a lock body 112 comprising a first portion 114 and a second portion 116, a latch cavity 118 (see FIG. 2), a first pin 120, a second pin 122, an arm 124, a linkage system 126, a shaft 128, an actuator 130, a controller 132, and a power source 134. The housing 110 can have various shapes configured to receive and retain the various other elements of the first access control system 100. In an example, the first panel 111 comprises a portion of the housing 110.

The jamb 102 can include an inner surface 109. The inner surface 109 can be a surface of the jamb 102 facing, and most proximal to, the outer surface 105 of the door 104. When the housing 110 is located within the jamb 102, the first panel 111 can be positioned flush with the inner surface 109.

In an example, the lock body 112 can include the first portion 114 and the second portion 116. The first portion 114 and the second portion 116 can comprise various similarly or differently shaped members. For example, the first portion 114 and the second portion 116 can each comprise an elongate L-shaped member. The first portion 114 and the second portion 116 can each be connected to the first pin 120 to thereby form the latch cavity 118 (see FIG. 2) therebetween. The latch cavity 118 can be sized and shaped to receive all or a portion of the latch tongue 108 that extends away from the door 104. The first pin 120 can generally be a cylindrical body or shaft and can define the first axis A1. In an example, the first pin 120 can be fixedly coupled inside the housing 110 in a position such that the first axis A1 extends parallel to the jamb 102 or to the inner surface 109 of the jamb.

Figure 3A:
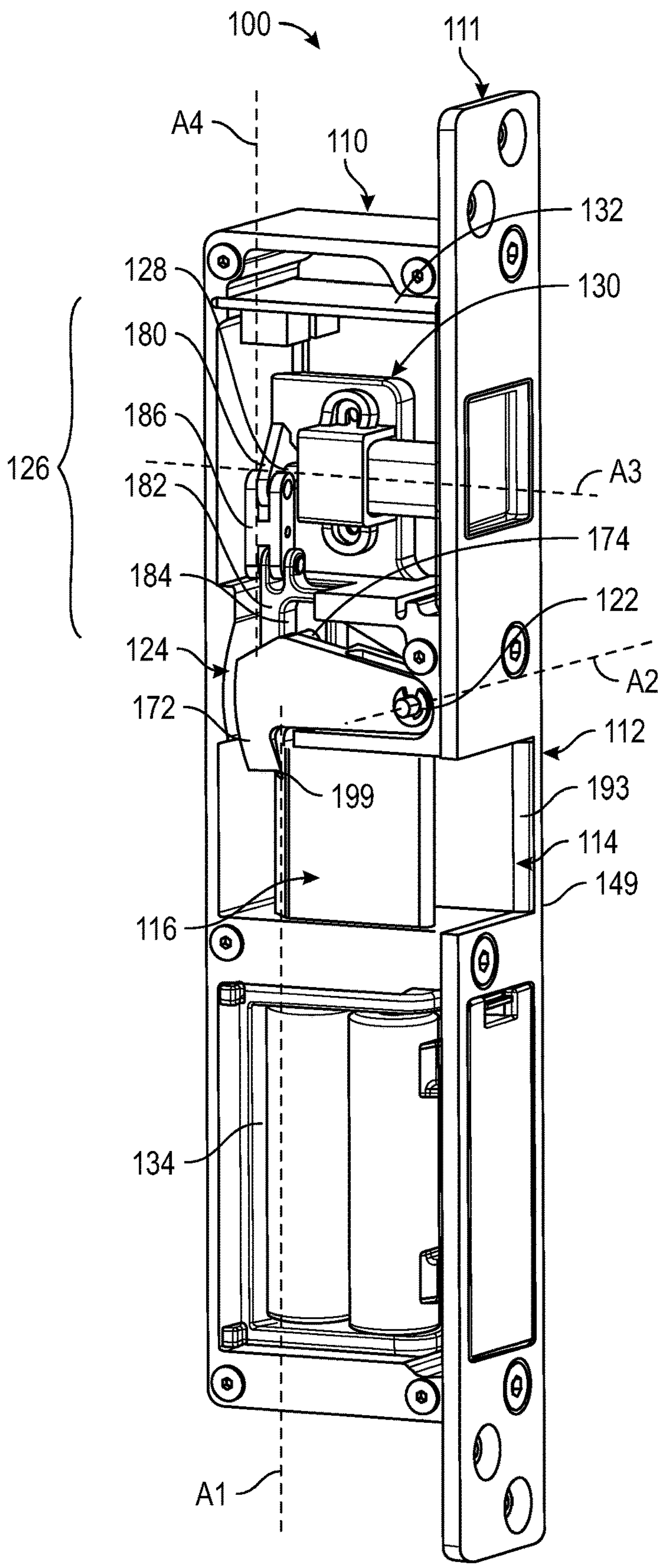
FIG. 3A illustrates an isometric view of the first access control system with a lock body in a locked position.
Figure 3B:
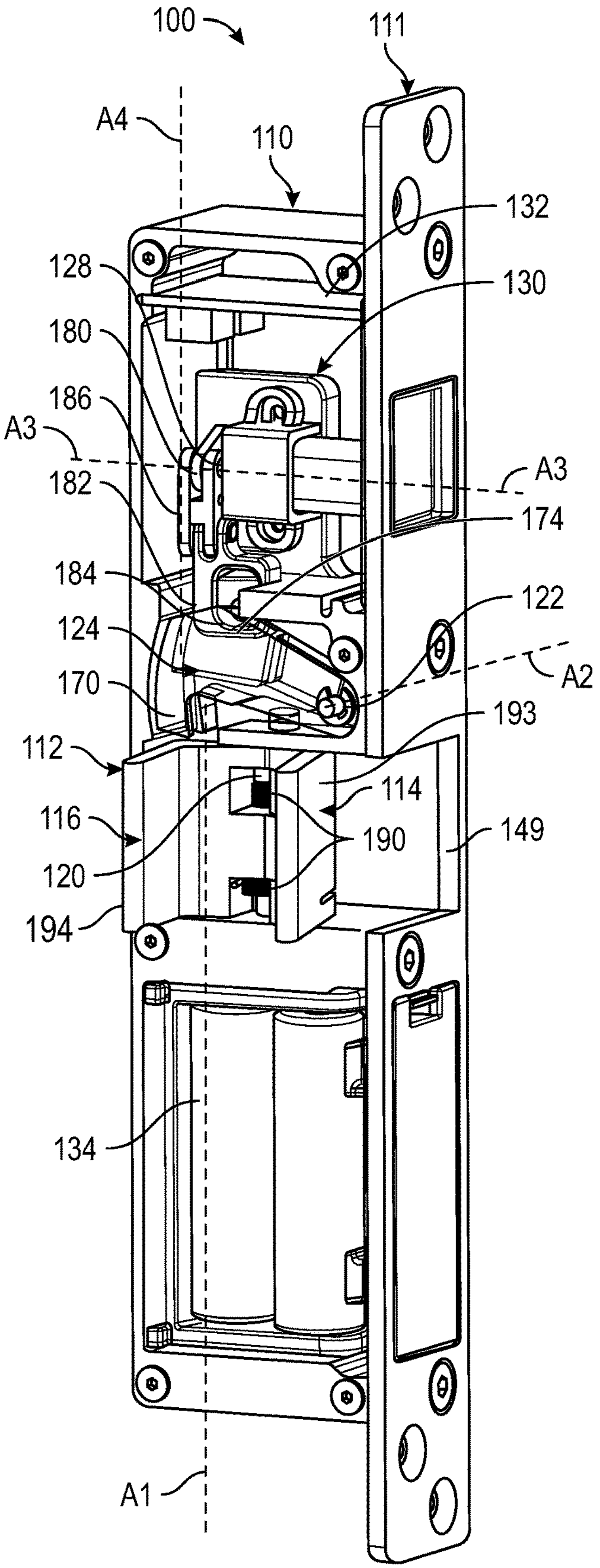
FIG. 3B illustrates an isometric view of the first access control system with a lock body in an unlocked position.

The lock body 112 can be pivotably coupled to, and extend radially outward from, the first pin 120, such that the lock body 112 is rotatable about the first axis A1 between a locked position (shown in FIG. 1B) and an unlocked position (shown in FIG. 3B). For example, in the locked position, the first portion 114 and the second portion 116 can extend radially outward from the first pin 120 in a direction generally parallel to the latch tongue 108 and orthogonal to the first axis A1, such as to retain the latch tongue 108 within the latch cavity 118 and thereby prevent the door 104 from being opened. In the unlocked position, the first portion 114 and the second portion 116 can extend radially outward from the first pin 120 at an acute or orthogonal angle relative to the latch tongue 108, such as to enable the latch tongue 108 to freely leave the latch cavity 118 and thereby allow the door 104 to be opened.

The second pin 122 can generally be a cylindrical body or shaft and can define the second axis A2. In an example, the second pin 122 can be fixedly coupled within the housing 110 in a position orthogonal to the first pin 120. The arm 124, such as can have various different shapes, can be pivotably coupled to, and extend radially outward from, the second pin 122, such that the arm 124 is rotatable about the second axis A2 between a first position (e.g., shown in FIG. 1B) and a second position (e.g., shown in FIG. 3B). For example, in the first position corresponding to a locked configuration, the arm 124 can contact and engage the second portion 116 of the lock body 112 to thereby maintain the lock body 112 in the locked position. In the second position corresponding to an unlocked configuration, the arm 124 can be disengaged from the lock body 112. When the arm 124 is disengaged from the lock body 112, a drive spring 190 (FIG. 2) can rotate the lock body 112 into the unlocked position. An amount or degree of rotation of the lock body 112 can be selected or changed to optimize operation of the system. The amount of rotation can be selected according to, for example, various characteristics such as alignment or dimensions of the jamb, the door 104, the latch tongue 108, or other component of the system. Generally, the amount of rotation can be selected such that, in the unlocked position, the lock body 112 releases the latch tongue 108 and the door 104 can swing freely, and the lock body 112 can receive the latch tongue 108 and be moved, through engagement with the latch tongue 108, toward and into the locked position as the door 104 swings shut.

In an example, the rotation of the arm 124 can be caused at least in part by an actuator 130. The actuator 130 can include the shaft 128, and the shaft 128 can define the third axis A3. In an example, the linkage system 126 can be configured to operably couple the shaft 128 to the arm 124, such that rotation of the shaft 128 causes a corresponding rotation of the arm 124. The actuator 130 can include a rotary actuator, an electric motor, or other device configured to rotate the shaft 128 about the third axis A3.

The actuator 130 can be fixedly coupled within the housing 110. In an example, the actuator 130 is positioned such that the third axis A3 extends orthogonally, or otherwise transversely, to the first axis A1 and the second axis A2. In an example, the actuator 130 can be controlled by the controller 132, such as can be configured to respond to wirelessly received signals from the external device 101 or other control system. In an example, the controller 132 can be configured to receive an unlock control signal or a lock control signal, and in response, control rotation of the shaft 128 of the actuator 130 to thereby cause the lock body 112 to rotate from the locked position to the unlocked position, or from the unlocked position to the locked position, respectively. The controller 132 can be in wireless communication with the external device 101. The external device 101 can be, for example, a mobile phone, a laptop computer, a home automation gateway, or a wearable electronic device, such as a Fitbit, a Jawbone, an Apple Watch, or other device in communication with the controller 132, optionally via one or more intermediate devices (e.g., a router, repeater, or other device).

In an example, the power source 134 can include a battery provided inside the housing 110. The battery can be rechargeable or replaceable by a user. The power source 134 can be configured to provide electrical energy to the controller 132 and the actuator 130 and optionally to one or more other components. Electrical connections between the power source 134 and the various components are omitted from the illustration for clarity. In other examples, the power source 134 can include a hard-wired connection to an external power source and can optionally comprise an AC/DC converter.

In an example, a user can use the external device 101 using a user interface that can accept one or more user inputs and/or provide various information to the user. To perform an unlock operation, for example, the external device 101 can generate and send an unlock control signal to the controller 132. The controller 132 can, in response, generate and provide an activation signal (e.g., a power signal having a particular polarity) to the actuator 130 to cause rotation of the shaft 128 in a first direction. The rotation of the shaft 128 can, in turn, cause at least a portion of the linkage system 126 to translate toward the actuator 130 along an axis extending parallel to, and laterally offset from, the first axis A1. Concurrently, as the linkage system 126 moves toward the actuator 130, the linkage system 126 can cause the arm 124 to rotate about the second axis A2 from the first position to the second position to, in turn, cause the lock body 112 to rotate about the first axis A1 from the locked position to the unlocked position. When the lock body 112 is sufficiently rotated such that the unlock operation is completed, the controller 132 can generate and send a deactivation signal to the actuator 130 to stop further rotation of the shaft 128.

Subsequently, a user can use the external device 101 to cause the external device 101 to generate and send a lock control signal to the controller 132. The controller 132 can, in response, generate and send an activation signal to the actuator 130 to cause rotation of the shaft 128 in a second direction to, in turn, cause the linkage system 126 to translate away from the actuator 130 along an axis extending parallel to, and laterally offset from, the first axis A1. Concurrently, as the linkage system 126 moves away from the actuator 130, the linkage system 126 can cause the arm 124 to rotate about the second axis A2 from the second position to the first position and, in turn, cause the lock body 112 to rotate about the first axis A1 from the unlocked position to the locked position. The controller 132 can then generate and send a deactivation signal to the actuator 130 to stop or inhibit further rotation of the shaft 128.

Figure 2:
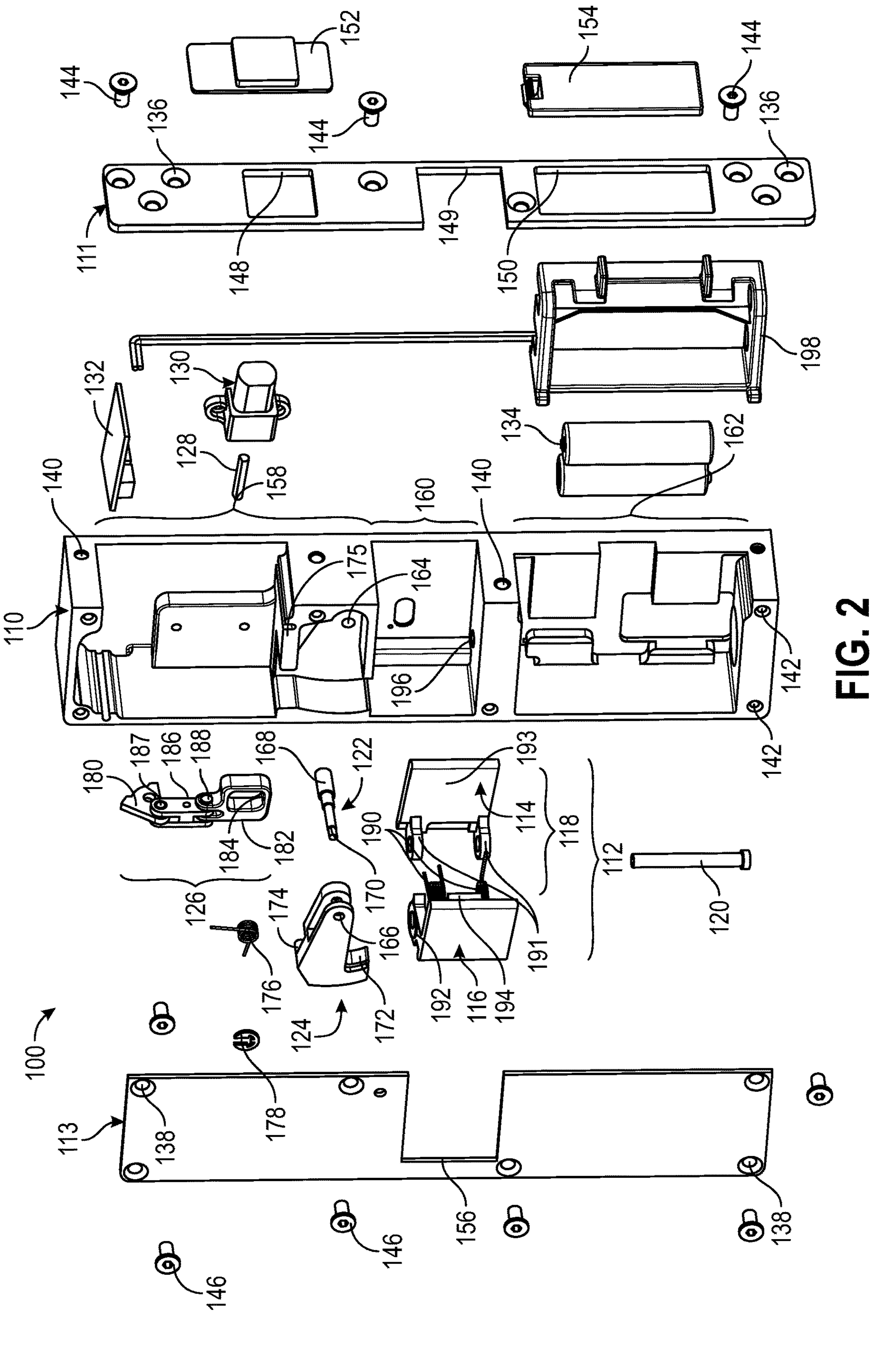
FIG. 2 illustrates an exploded view of the example first jamb-mounted access control system.

FIG. 2 illustrates an exploded view of the example first access control system 100. The first access control system 100 can include a housing 110 to contain various components of the first access control system 100. The housing 110 can include a shell that can be covered in part by the first panel 111 and a second panel 113. The first panel 111 and the second panel 113 can be sized and shaped to correspond to the housing 110. The first panel 111 and/or the second panel 113 can be configured to be removably coupled to the housing 110. For example, the first panel 111 can define a first plurality of apertures 136 and the second panel 113 can define a second plurality of apertures 138. The first plurality of apertures 136 and the second plurality of apertures 138 can be openings extending transversely through the first panel 111 and the second panel 113, such as orthogonally to the first axis A1 (FIG. 1B). The housing 110 can define a first plurality of bores 140 and a second plurality of bores 142. The first plurality of bores 140 and a second plurality of bores 142 can be configured to correspond to the first plurality of apertures 136 and the second plurality of apertures 138. For example, the first plurality of bores 140 and the second plurality of bores 142 can extend into the housing 110 in positions such that the first plurality of bores 140 and the first plurality of apertures 136, and the second plurality of bores 142 and the second plurality of apertures 138, are aligned when first panel 111 and the second panel 113 are positioned on the housing 110.

The first access control system 100 can include a first plurality of fasteners 144 and a second plurality of fasteners 146. The first plurality of apertures 136 and the first plurality of bores 140 can each be sized and shaped to receive a portion of one of the first plurality of fasteners 144 to couple the first panel 111 to the housing 110. Similarly, the second plurality of apertures 138 and the second plurality of bores 142 can each be sized and shaped to receive a portion of one of the second plurality of fasteners 146 to couple the second panel 113 of the housing 110. For example, each of the first plurality of bores 140 and the first plurality of fasteners 144 (or each of the second plurality of bores 142 and the second plurality of fasteners 146) can define corresponding threads, such as to allow each of the first plurality of fasteners 144 to threadably engage each of the first plurality of bores 142 to removably couple the first panel 111 (or the second panel 113) to the housing 110. In other examples, the first panel 111 or the second panel 113 can be removably secured to the housing 110 with other types of fasteners or other means of fixation such as, but not limited to, adhesives.

Additionally, the first panel 111 can define a plurality of mounting bores 143. The plurality of mounting bores 143 can each be sized and shaped to receive a portion of one of the first plurality of fasteners 144 to contact and engage the jamb 102 to secure the first access control system 100 thereto.

Alternatively, the first access control system 100 can be secured to the door frame 103 (FIGS. 1A-1B) with other types of fasteners or other means of fixation such as, but not limited to, adhesives. In one example, the first plurality of apertures 136 can include eight apertures, the first plurality of bores 140 can include four bores, the first plurality of fasteners 144 can include eight fasteners, the second plurality of apertures 138 can include six apertures, the second plurality of apertures can include six bores 142, and the second plurality of the fasteners 146 can include six fasteners. In other examples, the first access control system 100 can define or otherwise include, for example, but not limited to, two, three, five, or six, seven, or eight of any of the apertures 136, the bores 140, the fasteners 144, the apertures 138, the bores 142, and the fasteners 146. The first panel 111 can define a first opening 148 and a second opening 150. The first opening 148 and the second opening 150 can each be, for example, an aperture extending transversely through the first panel 111 and a second panel 113.

In an example, the first panel 111 can include one or more other openings or through-holes that can be configured to receive a secondary latch, such as a deadbolt. Such other opening can be spaced apart from a latch tongue of the door 104. This can help enable the first access control system 100 to provide additional security and improved compatibility with an existing or pre-installed mechanical door lock system.

In an example, the first panel 111 includes a first opening 148 that is configured to receive an antenna assembly 152 and/or a cover for an antenna. The antenna assembly 152 can include various antenna structures (e.g., one or more of conductive traces, plates, coils, or other means for generating or receiving a wireless signal) that can be electrically coupled to the controller 132. In some examples, a through-hole may be unnecessary when the first panel 111 comprises a radiotransparent material.

In an example, the first panel 111 includes a second opening 150 that allows a user access to the power source 134. For example, the second opening 150 can be sized and shaped to enable a user to replace the power source 134 through the second opening 150 without decoupling the first panel 111 from the housing 110 and without removing the housing 110 from the jamb. The first access control system 100 can include an access cover 154 configured to cover or otherwise block access to the second opening 150, such as to prevent debris or contaminants from entering the housing 110 and interfering with the power source 134 or other components located therein.

Referring now to FIGS. 3A and 3B, the first panel 111 can include a first recess 149 and the second panel 113 can include a second recess 156. The first recess 149 can be a cutout region sized and shaped to enable the lock body 112 to rotate into the locked position, such as shown in FIG. 3A. The lock body 112 can rotate about the first axis A1 and at least partially into the first recess 149 until a portion of the lock body 112 contacts a surface of the first panel 111, such as defined by an edge or sidewall of the first recess 149, to thereby limit further rotation of the lock body 112. In the locked position, a surface of the second portion 116 of the lock body 112 can be positioned flush or otherwise co-planar with the second panel 113. The second recess 156 can be a cutout region sized and shaped to enable the lock body 112 to rotate into the unlocked position, such as shown in FIG. 3B. For example, the lock body 112 can rotate about the first axis A1 at least partially into the second recess 156 until a portion of the lock body 112 contacts a surface of the second panel 113, such as defined by an edge or sidewall of the second recess 156 to thereby limit further rotation of the lock body 112.

Referring again to FIG. 2, the housing 110 can comprise multiple cavities, including a first cavity 158, a second cavity 160, and a third cavity 162. The first cavity 158 can be sized and shaped to receive at least the actuator 130 including the shaft 128, the controller 132, the second pin 122, the arm 124, and a wireless communication antenna, such as the antenna assembly 152. The housing 110 can define various features, such as any of offsets, bores, or mounting bosses within the first cavity 158 configured to orient and position the actuator 130 and the controller 132 within the housing 110. The actuator 130 and the controller 132 can be coupled to the housing 110 within the first cavity 158 by any of various fixation means, such as including, but not limited to, fasteners such as rivets, screws, pins, or adhesives. The housing 110 can define a second pin bore 164 within the first cavity 158. The second pin bore 164 can be sized and shaped to contact and receive at least a portion of the second pin 122 to orient and position the second pin 122 within the housing 110.

The arm 124 can include a pin aperture 166. The pin aperture 166 can generally be a bore or passage extending transversely through the arm 124. The pin aperture 166 can be sized and shaped such that the arm 124 can contact and receive a portion of the second pin 122 to enable the arm 124 to rotate about the second pin 122. In some examples, the second pin 122 can define a first surface 168 and a second surface 170. The first surface 168 can define an outer diameter that is larger relative to an outer diameter defined by the second surface 170. In such examples, the pin aperture 166 can define a smaller internal diameter relative to the second pin bore 164 formed in the housing 110 to correspond to the second surface 170 of the second pin 122, such as to thereby limit lateral translation of the arm 124 along the second pin 122 to help position the arm 124 within the housing 110.

The arm 124 can include an extension 172 and a projection 174. The extension 172 can be a generally be a curved or hooked portion of the arm 124. The extension 172 can extend toward the lock body 112 when the arm 124 is positioned within the first cavity 158 of the housing 110. The extension 172 can be configured to contact and engage the lock body 112 when the arm 124 is in the first position, as shown in FIG. 3A. The projection 174 can generally be a feature, such as a detent or cylindrical portion of the arm 124, that can couple with the linkage system 126. In other examples, the projection 174 can have various other shapes, such as triangular, rectangular, or hexagonal prism shapes, any of which can be configured to contact and engage the linkage system 126. In some examples, the projection 174 can be rotatably coupled to the arm 124.

In some examples, the housing 110 can include a divider 175 in the first cavity 158. The divider 175 can be a surface or other feature configured to limit rotation of the arm 124 about the second axis A2, such as to limit further rotation of the arm 124 when the arm 124 rotates into the second position and the extension 172 disengages the second portion 116 of the lock body 112.

In an example, first access control system 100 can include a biasing element 176 and a retainer 178. The biasing element 176 can include, for example, a coil or torsion spring. The biasing element 176 can be sized and shaped to be received about the second pin 122, such as by circumferentially encompassing at least a portion of the second pin 122. The biasing element 176 can be configured to engage the arm 124 to bias the arm 124 toward the first position and toward the lock body 112. The retainer 178 can be, for example, but not limited to, a C-clip, cotter pin, a nut, or other types of retaining features or fasteners. The retainer 178 can be configured to be received about a portion of the second pin 122 generally opposite a portion of the second pin 122 received within the second pin bore 164. The retainer 178 can define an outer diameter that is larger than a diameter defined by the pin aperture 166, to thereby prevent the arm 124 from disengaging the second pin 122, such as during rotation of the arm 124 about the second pin 122.

The linkage system 126 can extend within the first cavity 158 of the housing 110. The linkage system 126 can include a cam member 180, a first link member 182, and a second link member 186. The cam member 180 can have generally a triangular shape, however other shapes can similarly be used. The cam member 180 can be fixedly coupled to the shaft 128 of the actuator 130. For example, a portion of the shaft 128 can extend transversely through the cam member 180, such that the cam member 180 extends radially outward from the shaft 128.

In the example of FIG. 2, the first link member 182 comprises a generally rectangular outer profile with an aperture, however, other shapes, such as an ellipsoidal, cuboidal, or rectangular prism, can similarly be used. The first link member 182 can be configured to connect the cam member 180 to the arm 124. For example, the first link member 182 can define an inner surface 184. The inner surface 184 can be a surface of the aperture extending transversely through the first link member 182. The inner surface 184 can be configured to contact and engage the projection 174 of the arm 124.

The second link member 186 comprises a generally ellipsoid shape, however, other shapes, such as a rectangular prism, can similarly be used. The second link member 186 can be configured to movably couple the cam member 180 to the first link member 182. For example, the linkage system 126 can include a first connector 187 and the second connector 188. The first connector 187 and the second connector 188 can generally be fasteners such as, but not limited to, pins, dowels, shafts, or other cylindrical bodies. The second link member 186 and the cam member 180 can be configured to concurrently receive the first connector 187, and the second link member 186 and the first link member 182 can be configured to concurrently receive the second connector 188, such as by defining corresponding bores or apertures extending therethrough.

For example, the first connector 187 can extend transversely through an end portion of the second link member 186 and through the cam member 180 to enable the second link member 186 and the cam member 180 to rotate about a common pivot axis defined by the first connector 187. The second connector 188 can extend transversely through an end portion of the second link member 186 located opposite the first connector 187 and through a portion of the first link member 182 to enable the first link member 182 and the second link member 186 to rotate about a common pivot axis defined by the second connector 188.

Turning now to the second cavity 160, the lock body 112 can include or use a drive spring 190. The drive spring 190 can be, for example, but without limitation, a coil or torsion spring. The second cavity 160 can be sized and shaped to receive the lock body 112, the first pin 120, and the drive spring 190 at least partially therein. The drive spring 190 can be configured to be received about the first pin 120, such as by circumferentially encompassing a portion of the first pin 120. The drive spring 190 can be configured to engage the first portion 114 and the second portion 116 to bias the lock body 112 toward the unlocked position. In some examples, such as shown in FIG. 2, the first access control system 100 can include two drive springs 190. The first portion 114 of the lock body 112 can define a first hinge leaf 191 and the second portion 116 of the lock body 112 can define a second hinge leaf 192. The first hinge leaf 191 and the second hinge leaf 192 can each be configured to contact and receive a portion of the first pin 120 to thereby enable the lock body 112 to rotate about the first pin 120.

The first portion 114 of the lock body 112 can define a inner sidewall 193 and the second portion 116 of the lock body 112 can define a outer sidewall 194. The inner sidewall 193 and the outer sidewall 194 can generally comprise planar or flat surfaces. The inner sidewall 193 and the outer sidewall 194 can define the latch cavity 118 therebetween. In some examples, when the first pin 120 is received within the first hinge leaf 191 and the second hinge leaf 192, the inner sidewall 193 can extend a greater distance outwardly, away from the first pin 120, relative to the outer sidewall 194. The mismatch in sidewall dimensions is beneficial in several ways. For example, the mismatch can help facilitate quicker release of the latch tongue from the door when in the unlocked configuration because a distal edge of the shorter outer sidewall 194 can move away from a travel path of the latch tongue. Similarly but oppositely, the mismatch can help ensure receipt of the latch tongue and resetting of the lock when the latch tongue swings through with closing of the door because a distal edge of the longer inner sidewall 193 can interfere with the travel path of the latch tongue.

The housing 110 can define a first pin bore 196 within the second cavity 160. The first pin bore 196 can be sized and shaped to contact and receive a portion of the first pin 120 to position the first pin 120 within the housing 110.

The third cavity 162 of the housing 110 can be configured to receive the power source 134. For example, the housing 110 can define various features, such as any of offsets, bores, or mounting bosses within the third cavity 162 configured to orient and position the power source 134 within the housing 110. In some examples, the power source 134 can include, or can otherwise be received within, a battery box 198. The battery box 198 can generally be a housing configured to retain one or more batteries or battery packs, such as, but not limited to, AA batteries, AAA batteries, or the like.

In some examples, the first access control system 100 can be configured to receive both a day latch or primary latch of a lock system, such as can be operably connected to a handle or door-knob of the lock system 106, and a night latch or secondary latch of the lock system 106, such as operably connected to a deadbolt or night lock of the lock system 106. For example, the first access control system 100 can include at least two instances of the lock body 112 and drive spring 190. In such an example, one of the lock bodies can receive a day latch and the other can receive the night latch, and the first pin 120 can be configured to extend through the first hinge leaf 191 and the second hinge leaf 192 of each of the lock bodies. Alternatively, the lock body 112 can be sized and shaped to enable the latch cavity 118 to receive both a day latch and a night latch concurrently, such as a day latch and a night latch spaced vertically apart relative to one another along the door 104.

In some examples, the first access control system 100, including any of various components thereof, can be made from a variety of metals or alloys including nickel, steel, stainless steel, brass, or chrome. In some examples, the first access control system 100, including any of various components thereof, can be made from a variety of non-metallic materials such as, but not limited to, plastics, composites, ceramics, or rubbers. For example, any of the lock body 112, the first panel 111, the second panel 113, the first pin 120, the second pin 122, the arm 124, the linkage system 126, or the shaft 128 can be made from a metallic material, and the housing 110 can be made from a non-metallic material.

Referring again to FIGS. 3A and 3B, the first access control system 100 is shown with a lock body 112 in a locked position and in an unlocked position, respectively. FIGS. 3A and 3B further illustrate the first axis A1, second axis A2, a third axis A3, and a fourth axis A4. In the examples of FIGS. 3A and 3B, the second panel 113 is removed from the housing 110 for purposes of illustration, and in FIG. 3B the arm 124 is shown in wireframe.

In an example, the linkage system 126 or components thereof can define the fourth axis A4. The fourth axis A4 can extend parallel to and laterally offset from the first axis A1, and can be orthogonal to the third axis A3. As discussed above, the actuator 130 can control movement of the lock body 112. For example, the actuator 130 can activate to rotate the shaft 128 in a first or clockwise direction in response to receiving an unlock signal from the controller 132 and power from the power source 134. The linkage system 126 can, in turn, translate along the fourth axis A4 to cause a corresponding change in the rotational position of the arm 124 relative to the second axis A2. For example, the cam member 180, such as can be fixedly coupled to the shaft 128, can begin rotating in a first, or clockwise, direction about the third axis A3 to cause the second link member 186, which is movably coupled to the cam member 180, and the first link member 182, which is movably coupled to the second link member 186, to translate along the fourth axis A4 toward the actuator 130. More specifically, the inner surface 184 of the first link member 182 can contact the projection 174 of the arm 124 to thereby use the first link member 182 to cause the arm 124 to rotate about the second pin 122 in a first or anti-clockwise direction as the first link member 182 translates toward the actuator 130 along the fourth axis A4. For example, the projection 174 can slide laterally along the inner surface 184 of the first link member 182 toward the first panel 111. As the arm 124 rotates from the first position toward the second position, the extension 172 of the arm 124 can slide vertically along a surface of a notch 199 (FIG. 3A) such as can be defined in the second portion 116 of the lock body 112. The notch 199 can be a recess or alcove configured to accept the extension 172 of the arm 124 when the arm 124 is in the first position and the lock body 112 is in the locked position.

The controller 132 can be configured to provide power to the actuator 130 until the shaft 128 rotates to enable the arm 124 to reach the second position. For example, the controller 132 can cause the actuator 130 to rotate the shaft 128 until the extension 172 of the arm 124 leaves the notch 199 to thereby disengage from the second portion 116 of the lock body 112. Subsequently, the controller 132 can send a signal to the actuator 130 to deactivate the actuator 130 to cause the shaft 128 to stop rotating, such as by preventing the actuator 130 from receiving power from the power source 134. Alternatively, the actuator 130 can be configured to stop the shaft from rotating after the shaft 128 rotates a predetermined amount of rotation about the third axis A3, or after the arm 124 contacts the divider 175.

The actuator 130 can be configured to overcome a force applied to the arm 124 by the biasing element 176 to maintain the linkage system 126 in a position proximal to the actuator 130, to thereby maintain the arm 124 in the second position and the lock body 112 in the unlocked position until the actuator 130 receives a lock signal from the controller 132. For example, the controller 132 can be configured to enable the power source 134 to deliver power to the actuator 130 after the shaft 128 stops rotating, or after the arm 124 contacts the divider 175. After the arm 124 reaches the second position and disengages from the lock body 112, the drive spring 190 can cause the lock body 112 to rotate about the first axis A1 from the locked position shown in FIG. 3A to the unlocked position shown in FIG. 3B.

In an example, the drive spring 190 can apply a force to the first portion 114 and the second portion 116 of the lock body 112 to cause the lock body 112 to rotate about the first pin 120 until the outer sidewall 194 of the second portion 116 contacts the second panel 113 within the second recess 156. When the actuator 130 deactivates or loses power from the power source 134 at the direction of the controller 132, the biasing element 176 can cause the arm 124 to return to the first position. In one example, the arm 124 can come to rest at an intermediate position when the actuator 130 is unpowered and the arm 124 is biased toward the lock body 112. When the arm 124 is in the intermediate position, the lock body 112 can be maintained in the unlocked position unless or until a latch tongue (or other member external to the first access control system 100) causes rotation of the lock body 112 toward the locked position. In an example, the lock body 112 can include a surface, such as can include a shallow detent or groove corresponding to the notch 199, that is configured to receive the extension 172 and can help maintain the lock body 112 in the unlocked position until an external force moves the lock body 112 toward the locked position.

In another example, the lock body 112 can be configured to return to the locked position when the arm 124 is biased by the biasing element 176 toward the first position.

For example, the biasing element 176 can apply a force to the arm 124 to cause the arm 124 to rotate in a second, or anti-clockwise, direction until the extension 172 of the arm 124 re-engages the arm 124. For example, the biasing element 176 can cause the extension 172 to contact and translate along a surface of the second portion 116 within the notch 199 to correspondingly cause the lock body 112 to rotate toward the first panel 111 until the inner sidewall 193 of the first portion 114 contacts a surface of the first panel 111 within the first recess 149.

Rotation of the arm 124 in the second or anti-clockwise direction can concurrently cause the linkage system 126 to translate along the fourth axis A4 away from the actuator 130, and the shaft 128 to rotate in second or anti-clockwise direction. In another example, the actuator 130 can activate to begin rotating the shaft 128 in a second or anti-clockwise direction in response to receiving a lock signal from the controller 132 and power from the power source 134 to cause the arm 124 to return to the first position and the lock body 112 to return to the locked position. For example, the shaft 128 can rotate in the second or anticlockwise direction about the third axis A3 to cause the second link member 186 movably coupled to the cam member 180, and the first link member 182 movably coupled to the second link member 186, to translate along the fourth axis A4 away from the actuator 130 until the arm 124 re-engages the lock body 112 as discussed above.

Figure 4:
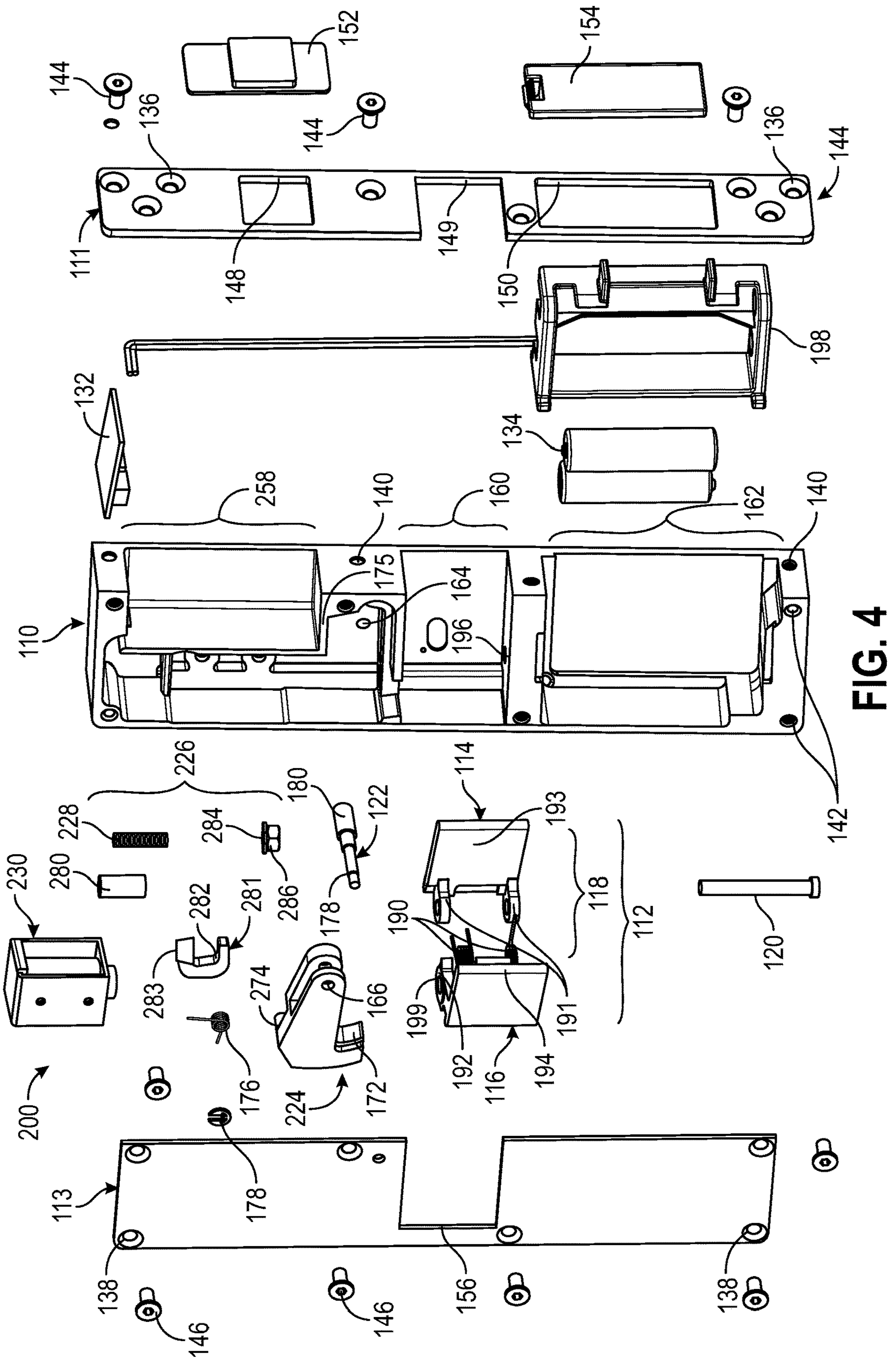
FIG. 4 illustrates an exploded view of the example second access control system.

FIG. 4 illustrates an exploded view of the example second access control system 200. The second access control system 200 includes several of the same or similar components to those discussed above in the example of the first access control system 100. For example, the second access control system 200 can include or use the housing 110, the first panel 111, the second panel 113, the lock body 112 including the first portion 114 and the second portion 116, the latch cavity 118, the first pin 120, the second pin 122, the arm 124, the controller 132, the power source 134, the first plurality of apertures 136, the second plurality of apertures 138, the first plurality of bores 140, the second plurality of bores 142, the first plurality of fasteners 144, the second plurality of fasteners 146, the first opening 148, the first recess 149, the second opening 150, the antenna assembly 152, the access cover 154, the second recess 156, the first cavity 158, the second cavity 160, the third cavity 162, the second pin bore 164, the pin aperture 166, the first surface 168, the second surface 170, the extension 172, the projection 174, the divider 175, the biasing element 176, the retainer 178, the drive spring 190, the first hinge leaf 191, the second hinge leaf 192, the inner sidewall 193, the outer sidewall 194, the first pin bore 196, the battery box 198, and the notch 199.

In contrast with the first access control system 100, the second access control system 200 can omit the actuator 130, the linkage system 126, and various other components. In place of such components, the second access control system 200 can include a second actuator 230 and a second linkage system 226. In an example, the second actuator 230 can include a solenoid configured to linearly drive a shaft 228, whereas the actuator 130 can include a motor configured to rotatably drive the shaft 128. The linkage system 226 can be configured to operably couple a shaft 228 to the arm 224, such that translation of the shaft 228 causes a corresponding rotational change in a position of the arm 224 about the second axis A2. In the example of the second system 200, the linkage system 226 can include a sleeve 280, a hook member 281, a spacer 284, and a nut 286. The sleeve 280 can be a tube or other cylindrical body. The sleeve 280 can be configured to circumferentially encompass all or a portion of the shaft 228. For example, the sleeve 280 can be sized and shaped to contact and receive a portion of the shaft 228, such that the shaft 228 can translate axially within the sleeve 280. Additionally or alternatively, the sleeve 280 can be configured to move together with the shaft 228 along a fifth axis A5 (see, e.g., FIG. 5A or FIG. 5B).

The shaft 228 can be a completely threaded, partially threaded, or unthreaded cylindrical body connected to, or can comprise a portion of, the actuator 230. The actuator 230 can be a linear actuator, solenoid, or other electromagnetic or electromechanics device that can be selectively activated to translate the shaft 228 toward or away from the actuator 230.

The housing 210 can define various features, such as any of offsets, bores, or mounting bosses within the first cavity 258 configured to orient and position the actuator 230 within the housing 210. For example, when the actuator 230 is positioned within the housing 210, the shaft 228 can extend axially along the fourth axis A4 (FIGS. 3A-3B). The actuator 230 can be coupled to housing 210 within the first cavity 258 by any of various fixation means, such as including, but not limited to, fasteners such as rivets, screws, pins, or adhesives.

The hook member 281 can generally form a curved, hooked, or otherwise semi-looped or loop shape. The hook member 281 can be sized and shaped to engage the projection 274 of the arm 224. The hook member 281 can define an inner surface 282 and a shaft bore 283. The inner surface 282 can be sized and shaped to contact and receive a portion of the projection 274 of the arm 224. The shaft bore 283 can be sized and shaped to contact and receive a portion of the shaft 228, such that the shaft 228 can translate axially within the shaft bore 283. The spacer 284 can be, for example, but not limited to, a washer, bushing, or other types of spacers. The spacer 284 can be sized and shaped to enable a portion of the shaft 228 to extend centrally therethrough. The nut 286 can be, for example, but not limited to, a threaded nut, a C-clip, cotter pin, or other types of retaining features or fasteners. The nut 286 can be sized and shaped to engage a portion of the shaft 228 to prevent the sleeve 280, the hook member 281, and the spacer 284 from disengaging from the shaft 228.

Figure 5A:
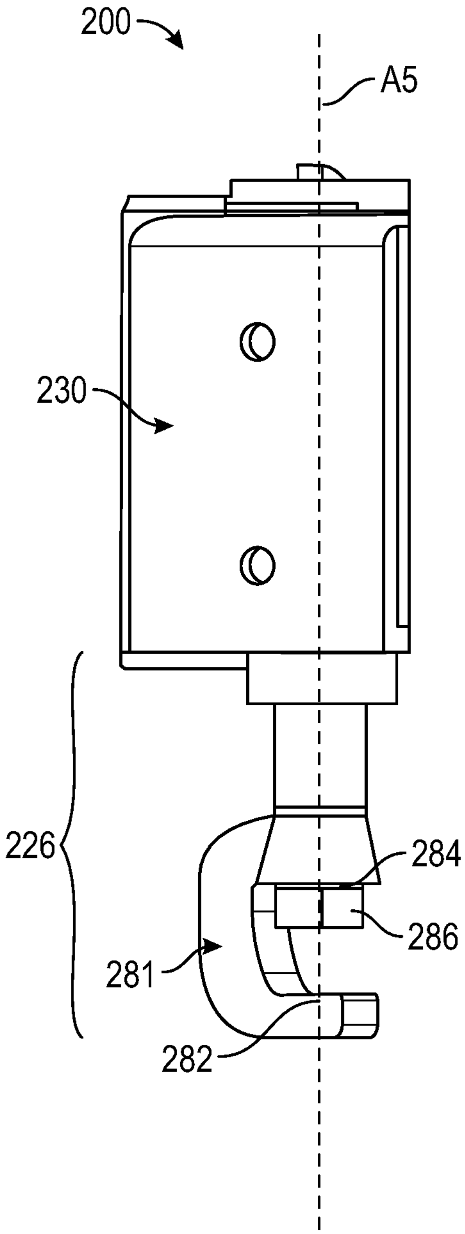
FIG. 5A illustrates an isometric view of a portion of the second access control system.
Figure 5B:
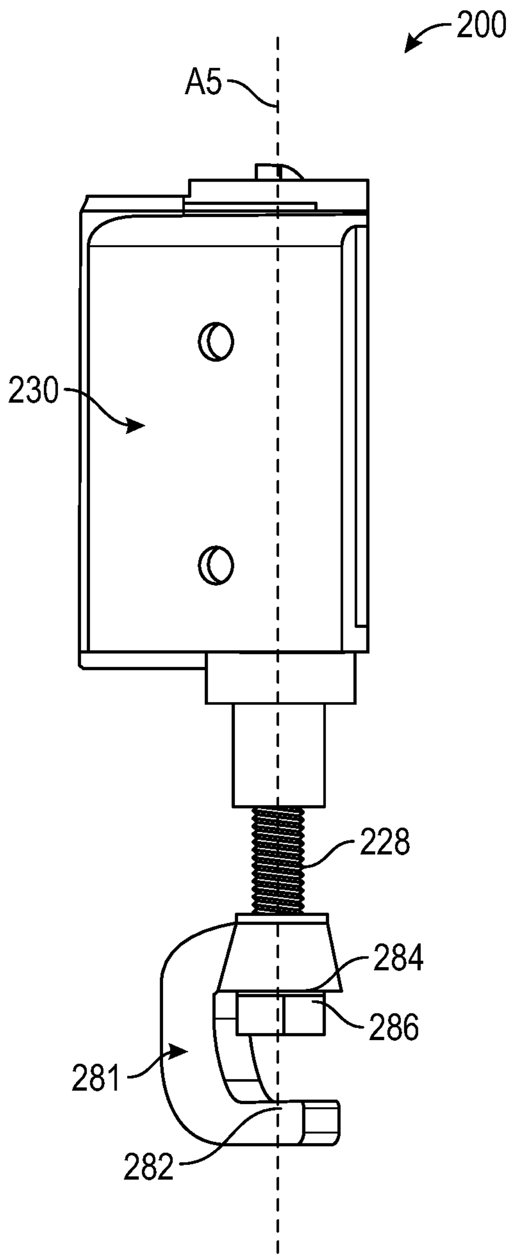
FIG. 5B illustrates an isometric view of a portion of the second access control system.

FIG. 5A illustrates an isometric view of a portion of the second access control system 200. FIG. 5B illustrates an isometric view of the second access control system 200 with a lock body 212 in a locked position. FIGS. 5A-5B include illustration of a fifth axis A5. FIGS. 5A-5B are discussed below concurrently with reference to the second access control system 200 shown in, and discussed with regard to, FIG. 4. The actuator 230 and the linkage system 226 can be drop-in replacements or alternatives to the actuator 130 and the linkage system 126 shown in FIGS. 1A-3B.

In an example that includes releasing the lock body, the actuator 230 can translate the shaft 228 along the fifth axis A5 toward the actuator 230 in response to receiving an unlock signal from the controller 232 and power from the power source 234. The linkage system 226 can, in turn, translate along the fifth axis A5 toward the actuator 230 to cause a corresponding change in the rotational position of the arm 224.

In an example, the inner surface 282 of the hook member 281 can contact the projection 274 of the arm 224 to cause the arm 224 to rotate about the axis of the second pin 222 in a first or anti-clockwise direction, as the hook member 281 translates toward the actuator 230 along the fifth axis A5. For example, the projection 274 can slide or rotate along the inner surface 282 of the hook member 281 as the hook member 281 translates away from the arm 224. Subsequently, because the arm 224 is connected to the shaft 228 via the linkage system 226, rotation of the arm 124 in a second or anti-clockwise direction, such as caused by the biasing element 276 or the actuator 230, can cause the linkage system 226 and the shaft 228 to translate along the axis A5 away from the actuator 230.

Figure 6:
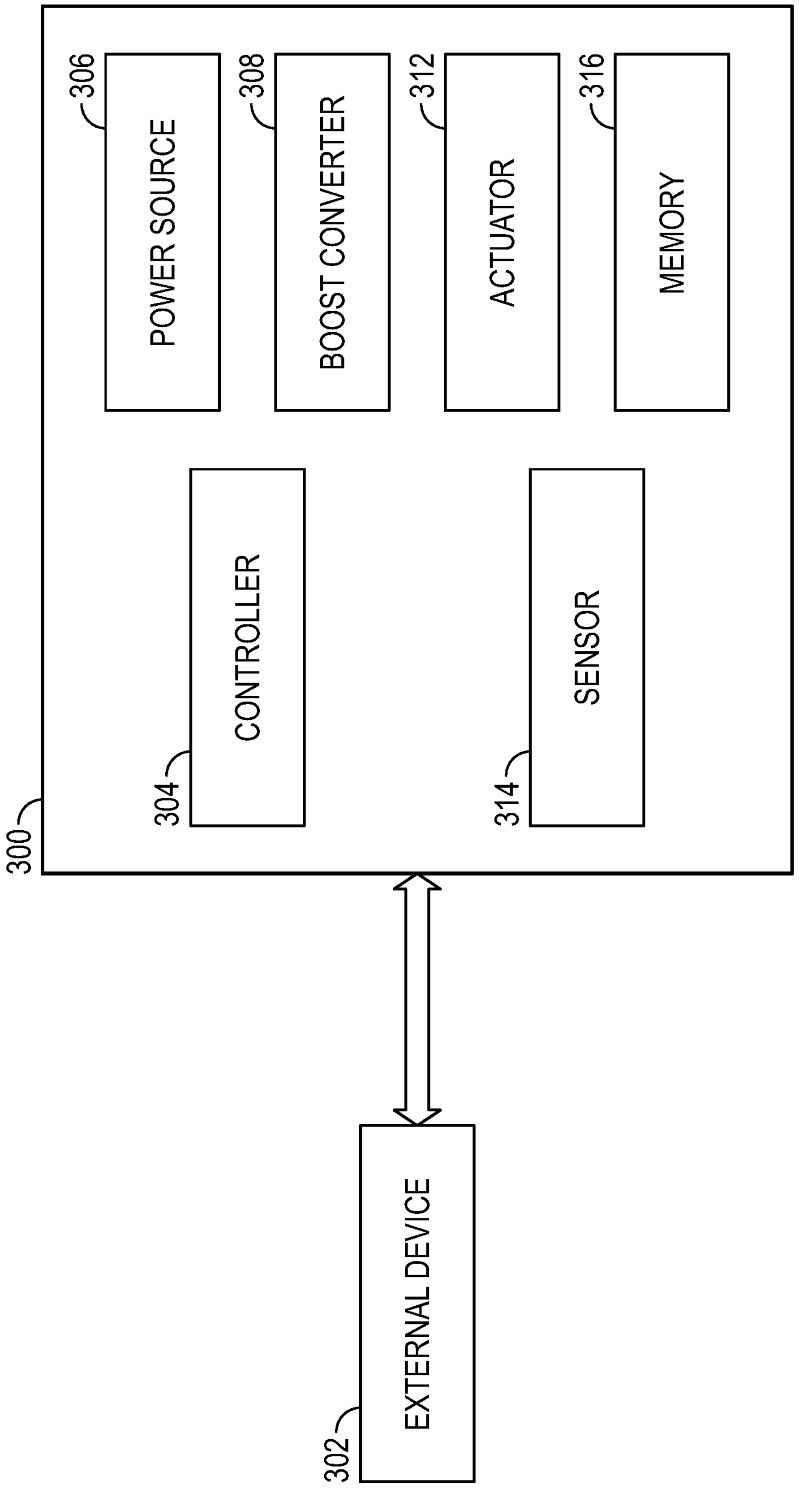
FIG. 6 illustrates an example block diagram of components of an access control system.

FIG. 6 illustrates an example block diagram of various components of an access control system 300. The access control system 300 can comprise one or both of the first or second access control systems 100 or 200. In the example of FIG. 6, the access control system 300 can be in one-way or two-way wired or wireless communication with the external device 302. The external device 302 can include or can be similarly configured to the external device 101. For example, the external device 302 can be any electronic device configured to exchange data signals with the system 300. In an example, the external device 101 can include a home automation gateway, a telephone, a wearable electronic device such as a Fitbit, a Jawbone, an Apple Watch, or a mobile device such as a mobile phone. In an example, the external device 302 and the access control system 300 are configured to communicate using one or more wireless communication protocols such as including Bluetooth, Zigbee, Z-wave, or WiFi, among others.

In some examples, the external device 302 can include propriety software, such as a mobile device application, configured to allow secure or otherwise encrypted communication with, and control various operations of, the access control system 300. The external device 302 can be operable by a user to send lock or unlock control signals directly to the access control system 300. In some examples, the external device 302 can be configured to indirectly communicate with the access control system 300, such as via various intermediary devices, connections, or communication techniques. For example, the external device 302 can send a lock or unlock control signal to a third-party server over a mobile internet connection, after which the lock or the unlock control signal can be forwarded to a home automation gateway via the Internet. Subsequently, the lock or unlock control signal can be transferred to the access control system 300, such as wirelessly using WiFi. Indirect communication can, for example, help provide access to various parties from a remote location.

In various examples, the access control system 300 can include components including but not limited to a controller 304, a power source 306, a boost converter 308, an actuator 312, a sensor 314, and a memory 316. The controller 304 can include, for example, the controller 132. The controller 304 can include a processor circuit, a transceiver circuit, an antenna, or one or more other circuits or components configured to control or coordinate operation of the actuator 312, sensor 314, memory 316, or to communicate with the external device 302. For example, the controller 304 can include an antenna or other components configured to enable the controller 304 to send data to or receive data from the external device 302 using various known wireless techniques and protocols, such as, but not limited to, Bluetooth, Z-Wave, Zigbee, NFC, LoRa, RFID, UMTS, LTE, 5G or Wi-Fi. The controller 304 can receive lock or unlock control signals directly, or indirectly, from the external device 302.

In an example, the external device 302 and the controller 304 can use encryption algorithms for various tasks or operations, such as any of data storage, processing operations, or wireless communication. In some examples, the controller 304 can be in two-way communication with the external device 302, or an intermediary device, such as a home automation gateway or a third-party server to strengthen the security of signal communication between the external device 302 or an intermediary device and the controller 304. For example, two-way communication can allow the use of additional security techniques, such as 2-factor authentication and encryption. Two-way communication can also enable a user to remotely monitor various factors pertaining to the jamb-mounted access control system 300, such whether the door 104 is in an open position or in a closed position, whether the lock body 112 is in the unlocked or locked position, or a charge level or state of the power source 306.

Additionally, two-way communication can enable the use of variable state authentication. For example, a user can select a lower level of authentication for retrieving access logs or system factor information, and a higher level of authentication for controlling access to physical operations of the access control system 300, such as rotation of the lock body 112. In further examples, time-based encryption of an encrypted key (Timing Specific Encryption) can be used by the external device 302 or the controller 304 for additional safety.

In an example, the controller 304 can include processing circuitry configured to enable the controller 304 to control various operations of the jamb-mounted access control system 300. For example, the processing circuitry can be configured to control activation and deactivation of the actuator 312, validate a lock or unlock request, or send or retrieve access logs or other system factor information from the memory 318.

The power source 306 can include the power source 134. The power source 306 can include, for example, but not limited to, a rechargeable a lithium-ion, lithium-polymer, or nickel metal hydride battery pack, or one or more rechargeable or disposable batteries, such as AA or AAA alkaline batteries. The power source 306 can optionally be configured to be serviced or replaced by a user.

In some examples, the power source 306 can include an electrical connection with external grid or mains power. In such examples, the power drawn from the grid or mains can be used to power the jamb-mounted access control system 300 and concurrently maintain a charge level of the power source 306, such that the power source 306 can be used as a backup power source. The power source 306 be in electrical communication with the controller 304 and any other electrical component of the jamb-mounted access control system 300, such as to enable the power source 306 to continuously or intermittently provide power thereto at the direction of the controller 304.

The boost converter 308 can be a DC-to-DC step up converter. The boost converter 308 can be configured to convert an input signal from the power source 306 to an output signal corresponding to the actuator 312. For example, the boost converter 308 can convert a 6-volt input signal from the power supply to a 12-volt output signal usable by the actuator 312. Other converter circuits to change a voltage level can similarly be used.

In an example, the actuator 312 can be a device configured to move a shaft. For example, the actuator 312 can be rotary actuator, electric motor, linear actuator, electromagnet, or a solenoid. In some examples, the actuator 312 can be fail-secure. For example, the actuator 312 can be configured to maintain the lock body 112 in the locked position in the event of a failure of one or more components of the actuator 312 or depletion or absence of the power source 306.

In some examples, the access control system 300 can include the sensor 314. The sensor 314 can include one or more sensors or switches, such as, but not limited to, a reed contact sensor, an optical sensor, or a capacitive or an inductive sensor. The sensor 314 can be configured to determine whether the lock body 112 is in an unlocked or locked position, or whether the latch tongue is in the latch cavity 218. For example, when the latch tongue 108 enters the latch cavity 118, the latch tongue 108 can contact the sensor 314 to cause the sensor 314 to generate a signal, such as can be received by the controller 304. Alternatively, or additionally, when the lock body 112 is in either the unlocked or locked position, the lock body 112 can contact the sensor 314. In response, the controller 304 can be configured to generate a signal for transmission to the external device 302. For example, the signal can be transmitted when the door 104 is detected to occupy an open position for at least a specified period of time or when the latch tongue fails to sufficiently enter the latch cavity 118. Other sensors can similarly be provided to sense information about the access control system 300, about a state of the door, or about the environment.

The memory 316 can include a physical storage medium, such as an internal microchip or an integrated circuit (IC) of the controller 304. Alternatively, the memory 316 can be an independent physical storage medium in electrical communication with the controller 304 and located within the jamb-mounted access control system 300, such as within the housing 110. The memory 316 can store data such as, but not limited to, access logs, system status information such as a charge level of the power source 306 or a position of the lock body 112, or processing instructions for the controller 304.

In some examples, the access control system 300 can include various electronic components for user identification purposes. For example, the access control system 300 can include a camera, keypad, biometric signal reader or scanner, or other means configured to receive a numerical code, password, passphrase, face recognition scan, barcode, QR code or other identification means at the controller 304 for validation. In some examples, the access control system 300 can include an antenna located externally to the housing 110, such as to enable or augment wireless communication.

Figure 7:
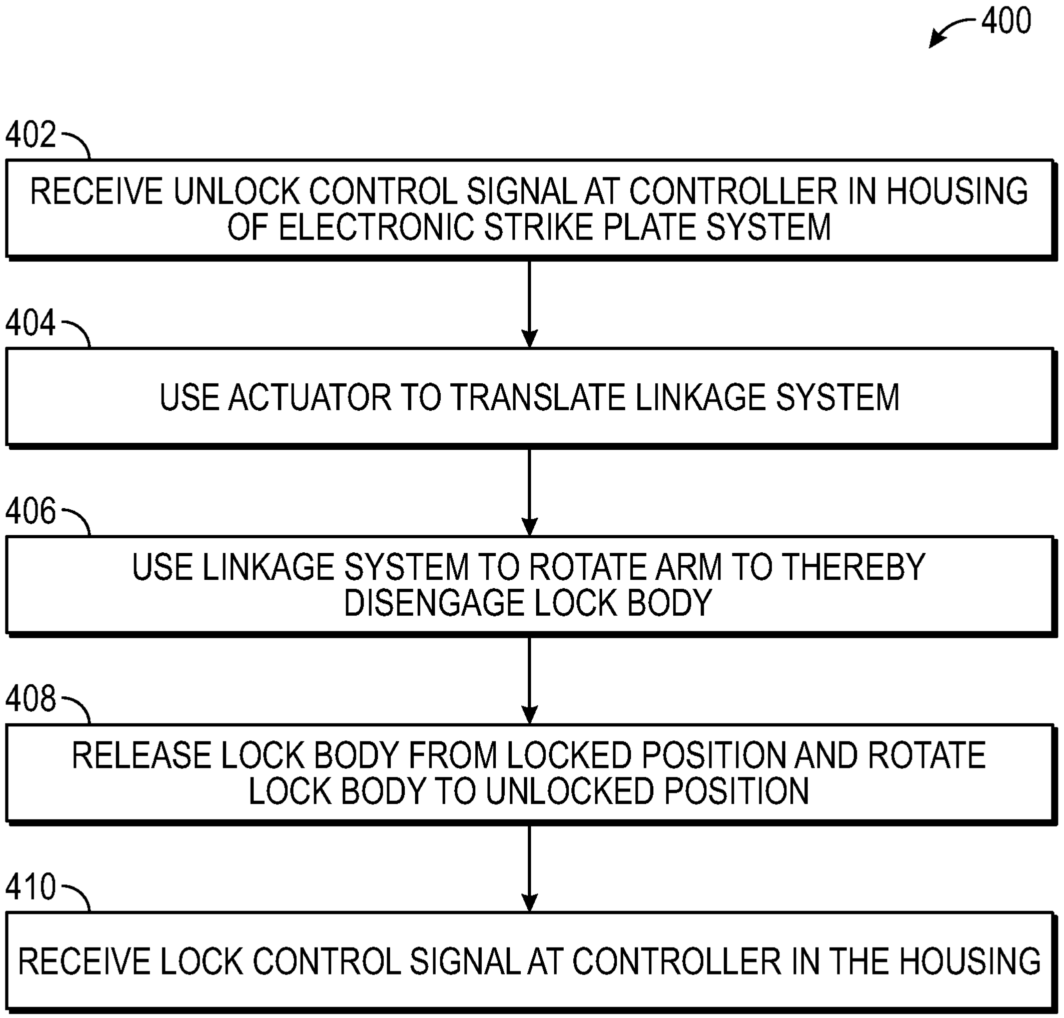
FIG. 7 illustrates a flowchart of a method of using an access control system.

FIG. 7 illustrates a flowchart of a method 400 of using an access control system. The method 400 can include or use an access control system that is disposed partially or entirely inside a door jamb and is configured to interface with a latch tongue of a door. The steps or operations of the method 400 are illustrated in a particular order for convenience and clarity. However, the operations can generally be performed in parallel or in a different sequence without materially impacting other operations. The method 400 includes operations that can be performed by multiple different actors, devices, and/or systems. It is understood that subsets of the operations discussed in the method 400 can be attributable to a single actor device, or system, and could be considered a separate standalone process or method.

The method 400 can begin at operation 402. Operation 402 can include receiving an unlock control signal at a controller in a housing of the jamb-mounted access control system. For example, a user can operate an external device, such as a mobile phone running an application that is configured to communicate with the controller of the access control system. The user can provide a command to send the unlock control signal to the controller.

The method 400 can optionally include operation 404. Operation 404 can include using the controller to activate an actuator to translate a linkage system connected to a shaft of the actuator toward the actuator along an axis extending parallel to and laterally offset from the doorjamb. For example, the controller can include processing circuitry operable to, in response to the lock control signal, cause the actuator to activate to rotate the shaft and thereby translate the linkage system.

At operation 406, the method 400 can include rotating an arm from a first position to a second position to disengage the lock body in response to rotation of the shaft. In an example, the rotation is about a second axis that extends orthogonally to the door jamb. For example, the shaft of the actuator can be connected to the arm via the linkage system, and in response to rotation or translation of the shaft, the linkage system can cause the arm to rotate, such as to engage or disengage the lock body.

At operation 408, the method 400 can include releasing a lock body to rotate, about a first axis that extends parallel to the doorjamb, between a locked position and an unlocked position. In the first position, the arm can engage the lock body and inhibit rotation of the lock body, and in the second position, the arm can disengage from the lock body such that the lock body is free to rotate about the first axis. In an example, the actuator can cause the arm to rotate to the second position in which the arm can be disengaged from the arm. In such an example, the lock body can be biased, such as using a spring, toward the unlocked position when the arm is disengaged from the lock body.

At operation 410, the method 400 can include receiving a lock control signal at a controller in a housing of the jamb-mounted access control system. For example, a user can operate an external device, such as a mobile phone running an application configured to communicate with the controller, to send the lock control signal to the controller. In response to the lock control signal, the controller can optionally cause the arm to re-engage with the lock body.

The foregoing systems and devices, etc. are merely illustrative of the components, interconnections, communications, functions, etc. that can be employed in carrying out examples in accordance with this disclosure. Different types and combinations of sensors, or other installed or portable electronics devices, computers including clients and servers, and other systems and devices can be employed in examples according to this disclosure.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided.

Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein. In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure.

This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. A wirelessly-controlled jamb-mounted access control system, the system comprising:

a housing configured to be disposed in a door jamb;

a lock body at least partially inside the housing and rotatable about a first axis between locked and unlocked positions, wherein the first axis extends parallel to the door jamb, and wherein the lock body includes inner and outer sidewalls that define a latch cavity configured to receive a latch tongue of a swinging door, wherein the inner sidewall extends away from the first axis by a first distance, and wherein the outer sidewall extends away from the first axis by a different second distance;

an arm inside the housing and rotatable between first and second positions, wherein in the first position, the arm engages the lock body and inhibits rotation of the lock body about the first axis, and in the second position, the arm is disengaged from the lock body, wherein the arm rotates about a second axis extending orthogonally to the first axis;

an actuator configured to control release of the lock body from the locked position in response to a control signal; and a linkage system coupling a shaft of the actuator to the arm, wherein rotation of the shaft is configured to cause a corresponding change in position of the arm;

wherein the actuator is a rotary actuator configured to rotate the shaft about a third axis, the third axis extending orthogonally to the first axis and the second axis; and wherein the linkage system includes:

a first link member engageable with the arm;

a second link member movably coupled to the first link member; and a cam member extending radially outward from the shaft and movably coupled to the second link member, the cam member configured to translate the second link member and the first link member along a fourth axis in response to the rotation of the shaft, the fourth axis extending parallel to and laterally offset from the first axis.

2. The system of claim 1, wherein the lock body includes:

a first opposing portion defining the inner sidewall and rotatable about a pin inside the housing, the pin defining the first axis; and a second opposing portion defining the outer sidewall and rotatable about the pin concurrently with the first opposing portion.

3. A wirelessly-controlled jamb-mounted access control system, comprising:

a housing configured for installation in a doorjamb;

a lock body at least partially inside the housing and rotatable about a first axis between locked and unlocked positions, wherein the first axis extends parallel to the door jamb, and wherein the lock body includes inner and outer sidewalls that define a latch cavity configured to receive a latch tongue of a door;

an arm located within the housing and rotatable between a first position and a second position, in the first position, the arm engages the lock body and maintains the lock body in the locked position, and in the second position, the arm disengages from the lock body, wherein the arm rotates between the first and second positions about a second axis extending orthogonally to the first axis;

a rotary actuator including a shaft rotatable about a third axis, the third axis extending orthogonally to the first axis and the second axis;

a linkage system coupling the shaft to the arm, the linkage system configured to rotate the arm between the first position and the second position in response to rotation of the shaft, wherein the linkage system includes a first link member engageable with the arm, a second link member movably coupled to the first link member, and a cam member extending radially outward from the shaft and movably coupled to the second link member, the cam member configured to translate the second link member and the first link member along a fourth axis in response to rotation of the shaft, the fourth axis extending parallel to and laterally offset from the first axis;

a controller located within the housing and in electrical communication with the actuator, the controller configured to control the rotation of the shaft in response to a signal from an external device; and a power source in the housing and configured to provide power to the actuator and the controller;

wherein the lock body includes a first opposing portion defining the inner sidewall, and rotatable about a pin inside the housing, the pin defining the first axis, and the lock body includes a second opposing portion defining the outer sidewall, and rotatable about the pin concurrently with the first opposing portion, wherein the first and second opposing portions extend away from the first axis by different first and second amounts.

4. The system of claim 3, wherein the first link member comprises an aperture extending transversely therethrough and the arm includes a projection member, the projection member translatable along an inner surface of the first link member within the aperture in response to rotation of the shaft.

5. The system of claim 3, further comprising a drive spring located within the housing and configured to bias the lock body toward the unlocked position, wherein the drive spring is configured to rotate the lock body from the locked position to the unlocked position when the arm is in the second position.

6. The system of claim 3, further comprising a sensor in electrical communication with the controller and the power source, the sensor configured to provide a signal to the controller, the signal indicative of a position of the latch tongue relative to the inner sidewall and the outer sidewall of the lock body.

7. The system of claim 3, wherein the housing defines an outer surface and an opening extending therethrough configured to enable replacement of the power source; and wherein the system further comprises an access cover engageable with the housing to cover the opening, the access cover positioned flush with the outer surface of the housing when engaged with the housing.

8. An access control method using a jamb-mounted access control system, wherein the jamb-mounted access control system is disposed inside a door jamb and is configured to interface with a latch tongue of a door, the method comprising:

receiving an unlock control signal at a controller in a housing of the jamb-mounted access control system;

using the controller, activating an actuator to rotate a cam member of a linkage system, wherein the linkage system includes a first link member engageable with a rotatable arm, a second link member movably coupled to the first link member, and the cam member movably coupled to the second link member, the rotation of the cam member is configured to translate the second link member and the first link member along a first axis that extends parallel to the door jamb such that the rotatable arm is rotatable from a first position to a second position, wherein the rotation of the rotatable arm is about a second axis that extends orthogonally to the door jamb;

in response to the rotation of the rotatable arm, releasing a lock body to rotate between a locked position and an unlocked position about a third axis that extends parallel to the door jamb, wherein in the first position, the rotatable arm engages the lock body and inhibits rotation of the lock body, and in the second position, the rotatable arm is disengaged from the lock body.

9. The method of claim 8, wherein activating the actuator includes translating the first and second link members of the linkage system toward the actuator along the first axis.

10. The method of claim 8, wherein the method further comprises:

receiving a lock control signal at the controller in the housing of the jamb-mounted access control system;

using the controller, activating the actuator to use the linkage system to rotate the rotatable arm from the second position to the first position; and in response to the rotation of the rotatable arm, engaging the lock body to rotate, about the third axis, between the unlocked position and the locked position.

* * * * *